(12) United States Patent
Asher

(10) Patent No.: US 7,912,839 B1
(45) Date of Patent: Mar. 22, 2011

(54) METHOD AND APPARATUS FOR CREATING A NON-UNIFORM INDEX STRUCTURE FOR DATA

(75) Inventor: Michael Asher, Green Cove Springs, FL (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 283 days.

(21) Appl. No.: 11/756,355

(22) Filed: May 31, 2007

(51) Int. Cl.
*G06F 17/30* (2006.01)

(52) U.S. Cl. .................. 707/743; 707/802; 707/957

(58) Field of Classification Search .................. 707/100, 707/743, 802, 957, E17.002, 999.1
See application file for complete search history.

(56) References Cited

U.S. PATENT DOCUMENTS

| | | | |
|---|---|---|---|
| 5,627,909 A * | 5/1997 | Blaylock et al. | 382/139 |
| 5,826,076 A * | 10/1998 | Bradley et al. | 707/4 |
| 5,848,416 A * | 12/1998 | Tikkanen | 707/101 |
| 6,014,614 A * | 1/2000 | Herring et al. | 702/196 |
| 6,161,105 A * | 12/2000 | Keighan et al. | 1/1 |
| 6,460,026 B1 * | 10/2002 | Pasumansky | 707/737 |
| 6,587,103 B1 * | 7/2003 | Tucker | 345/421 |
| 6,732,120 B1 * | 5/2004 | Du | 715/764 |
| 6,771,802 B1 * | 8/2004 | Patt et al. | 382/128 |
| 6,868,420 B2 * | 3/2005 | Perry et al. | 707/743 |
| 6,920,446 B1 * | 7/2005 | Wang et al. | 707/2 |
| 6,952,661 B2 * | 10/2005 | Agrawala et al. | 703/2 |
| 7,277,841 B1 * | 10/2007 | Novak et al. | 703/18 |
| 7,373,353 B2 * | 5/2008 | Adler et al. | 707/101 |
| 7,535,473 B2 * | 5/2009 | Antoine | 345/502 |
| 2003/0009453 A1 * | 1/2003 | Basso et al. | 707/3 |
| 2003/0212689 A1 * | 11/2003 | Chen et al. | 707/100 |
| 2004/0100465 A1 * | 5/2004 | Stowe et al. | 345/427 |
| 2005/0071349 A1 * | 3/2005 | Jordan et al. | 707/100 |
| 2005/0223044 A1 * | 10/2005 | Ashworth et al. | 707/200 |
| 2006/0036628 A1 * | 2/2006 | Adler et al. | 707/100 |
| 2006/0058985 A1 * | 3/2006 | Arslan et al. | 703/2 |
| 2006/0106833 A1 * | 5/2006 | Chen et al. | 707/100 |
| 2007/0233720 A1 * | 10/2007 | Bae et al. | 707/101 |
| 2008/0228783 A1 * | 9/2008 | Moffat | 707/100 |
| 2008/0270468 A1 * | 10/2008 | Mao et al. | 707/104.1 |

* cited by examiner

*Primary Examiner* — Charles Rones
*Assistant Examiner* — Phuong-Thao Cao

(57) ABSTRACT

A method and apparatus for creating a non-uniform index structure for data are disclosed. For example, the method sets at least one threshold for at least one of: a number of objects in a cell, or a maximum number of decompositions for a cell. The method creates a plurality of cells by overlaying a grid over a plurality of objects and decomposes each of the plurality of cells until either the maximum number of decompositions is reached, or the number of objects in each cell is below the at least one threshold for numbers of objects in a cell. The method then creates a key for each cell, and creates an index structure for the data using said key for each cell.

15 Claims, 4 Drawing Sheets

METHOD AND APPARATUS FOR CREATING A NON-UNIFORM INDEX STRUCTURE FOR DATA

The present invention relates generally to data processing and, more particularly, to a method and apparatus for creating a non-uniform index for data, e.g., multidimensional data such as spatial data.

BACKGROUND OF THE INVENTION

Businesses and consumers rely on information processing infrastructures for accessing and sharing information. The information or data is often organized and kept in records for ease of access by multiple users or applications. When the collection of information is organized in electronically accessible records, it is managed and updated by computers. These electronically accessible records can be indexed and stored into operational databases. However, standard query languages are generally suitable for single dimensional data. For example, for a database containing building locations, a two dimensional index may be built to cover a region. For each building a two dimensional coordinate may be built that identifies the building in terms of its latitude and longitude. A query for a building is then answered by a database management system by creating two slices (one for covering longitudinal range and one for covering latitudinal range) and intersecting the two results. This approach is highly inefficient as the processing is multiplied by the number of dimensions.

Another approach is to create cells by overlaying a uniform grid over the range of data. Objects that lie within a cell are then assigned to that cell. In order to retrieve an object within a cell, all objects within a range of grids are retrieved and subjected to a brute-force search. However, this method is not workable if the data itself is not uniformly distributed. For example, if a cell size of one mile by one mile (1×1) is selected, there may be too many buildings in a 1×1 cell in an urban area making it impractical for brute force search. Furthermore, cells for other areas (e.g., rural areas) may be empty or virtually empty. Indexing and storing empty cells requires storage space and decreases the efficiency of the index table.

SUMMARY OF THE INVENTION

In one embodiment, the present invention discloses a method and apparatus for creating a non-uniform index structure for multi-dimensional data, e.g., spatial data. For example, the method sets at least one threshold for at least one of: a number of objects in a cell, or a maximum number of decompositions for a cell. The method creates a plurality of cells by overlaying a grid over a plurality of objects and decomposes each of the plurality of cells until either the maximum number of decompositions is reached, or the number of objects in each cell is below the at least one threshold for numbers of objects in a cell. The method then creates a key for each cell, and creates an index structure for the data using said key for each cell.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1A:
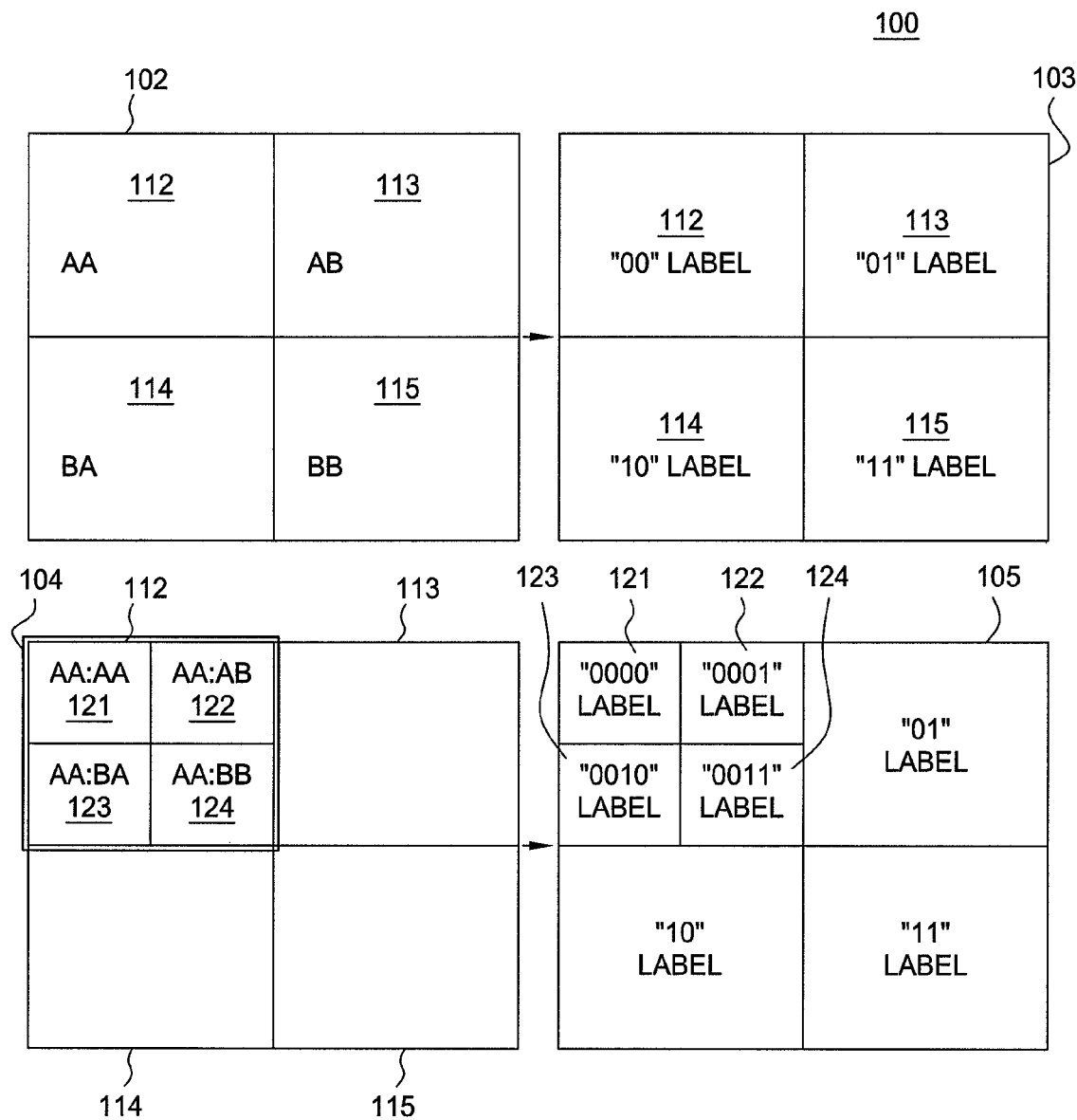
FIG. 1 (comprised of FIGS. 1A and 1B) illustrates a grid of the current invention for creating a non-uniform index structure for data.
Figure 1A:

Non-uniformly distributed data, e.g., spatial data, require non-uniform index structure of multiple dimensions. However, standard query languages are generally suitable for single dimensional data. As noted, overlaying a uniform grid over a large data in order to force-fit the data into a traditional database management system supported by a standard query language, results in a highly inefficient index structure with most of the index structure and storage dedicated for handling empty cells.

In one embodiment, the current invention provides a method and apparatus for creating a non-uniform index structure for a multidimensional data, e.g., spatial data, by using a recursive process to dynamically decompose cells. In order to clearly illustrate the present invention, the following terminologies will first be described. These terminologies are:

Grid;
Cell;
Decomposition;
Zero-padding; and
A unique primary key.

A grid refers to a pattern of lines on a chart or map that can be used to indicate location. For example, a grid on a map representing latitudes may indicate the latitudinal location of an object.

A cell refers to an area (or a region) derived by creating multiple grids on a chart or a map to indicate a location in multiple dimensions. A cell then covers a range of values in each dimension. For example, two grids representing latitudes and longitudes may be created to indicate the longitudinal and latitudinal locations of an object. For example, the x-axis may indicate latitudes and y-axis may indicate longitudes; an x, y-coordinate system then indicates locations of objects in two dimensions. Each cell covers a range of values in x and a range of values in y.

Decomposition in this disclosure refers to a process of creating sub-cells. For example, for the above spatial data, a cell size of one mile by one mile may be decomposed into 4 sub-cells of ½ mile by ½ mile.

Zero-padding in this document refers to a process of adding zeros to binary strings to conform to a specific binary string length. For example, if a binary string is "111" and all binary strings are to be 8 bits long, five zeros are added to change the "111" to "11100000" in order to create an 8 bit binary string.

A unique primary key refers to a numeric quantity in a table that uniquely identifies an entry or a group of entries in a database. For example, if a database contains 100 entries, a primary key may be defined for each entry, for a range of entries, etc. For example, the 100 entries may be divided into 10 groups, and one primary key may be defined to identify each group. The 10 primary keys may then be used for querying (e.g., retrieving). If a specific single entry is to be retrieved, the primary key may be used for retrieving the group and then the desired entry may be selected from the group.

In one embodiment, the current invention provides a method and apparatus for creating a non-uniform index structure for multidimensional data. For example, the method may set thresholds for a number of objects in a cell, and a minimum cell size. The method then overlays an n×m grid over the range of objects, creating nm cells. For example, with n=m=2, the method may overlay a 2×2 grid over a map of the United States creating 4 cells. The method then determines the number of objects enclosed in each cell. If the number of objects within a cell exceeds the pre-determined threshold, then the method may decompose the cell until either a minimum cell size threshold is reached or the number of objects within each cell is below the threshold. The current method uses a recursive process to dynamically decompose cells. The minimum cell size criteria may be equally stated in terms of a maximum number of subdivisions. For the above example, allowing 2 subdivisions in each direction to cover a one mile by one mile region would be equal to setting the minimum cell size to approximately ¼ mile by ¼ mile. More specifically, in the first subdivision ½ mile by ½ mile cells are created. If the number of objects within a ½ mile by ½ mile cell exceeds the threshold, then that cell is subdivided to cells of ¼ mile by ¼ mile size. However, if the number of objects within a ¼ mile by ¼ mile cell exceeds the threshold, the cell is no longer subdivided since the minimum cell size (maximum number of subdivisions) has been reached.

Note that some cells may reach the threshold for the number of objects within a cell in one or two decompositions while other cells may require more. However, the cells eventually enclose roughly the same number of objects, assuming the minimum cell size is selected appropriately for the data. Hence, a scan of a cell in response to a query takes approximately the same amount of time and effort for any cell. Since smaller sized cells are created only when the larger sized cells contain a number of objects exceeding the threshold, the smaller sized cells are created based on necessity. For example, a cell covering an urban area in which buildings are the objects, may require many decompositions. Another cell covering a rural town may require just 1 or 2 decompositions. The current method then creates a unique primary key for representing each cell. In one embodiment, the current method assigns binary labels for each cell.

FIG. 1A illustrates a grid 100 of the current invention for creating a non-uniform index structure. For example, a 2×2 grid 102 may have 4 cells 112, 113, 114 and 115 represented by labels AA, AB, BA and BB, respectively. The "A" may then be replaced by a "0" and the "B" may be replaced by a "1" in cells 112-115 to create a binary string representing the labels for each cell to achieve the grid 103 with binary string labels. The binary strings for cells AA, AB, BA and BB are then 00, 01, 10, 11, respectively. If a cell is decomposed, the label is extended for that cell. For example, if the cell AA shown in 112 is decomposed, the cells 121, 122, 123 and 124 are created with labels AA:AA, AA:AB, AA:BA and AA:BB, respectively. The cells 121-124 are shown in grid 104 as a decomposed version of cell AA.

The ":" is used to separate decomposition levels. The first 2 letters indicate the labels in the first decomposition, the letters following the colon indicate the labels in the second decomposition. For example, the corresponding binary strings are then 0000, 0001, 0010, 0011, respectively as shown in grid 105. Since the number of decompositions is variable, the number of bits in the above binary string is also variable. In one embodiment, the current method then performs zero-padding on the binary strings to allow for indexing and querying of cells. For example, if the maximum number of divisions is five, the longest cell name may contain 10 bits. Hence, cell names shorter than 10 bits are extended by zero-padding. For example, the cell name for AA:BB may be extended from "0011" to "0011000000." The unique primary key may then be created from the 10 bit binary string for each cell. For example, the binary string may be represented by a primary key created by converting the string to a base 10 numeric quantity. For the binary string "0011000000" the primary key then has the value of 192 ($2^7+2^6$=192). A 32 bit binary string index structure may then effectively encompass 16 decompositions. In one embodiment, the current method provides smaller cell sizes using a 64 or 128 bit indexer.

Note that due to the zero-padding, a given numeric value may refer to more than one cell. For example, the above primary key of 192 may refer to cell AA:BB, cell AA:BB:AA, and so on. However, the cell AA:BB:AA cannot exist unless the cell AA:BB is decomposed. Therefore, the primary key is unique even if the cell reference is not unique. An equality query may then be used to query for any existing cell.

Figure 1B:
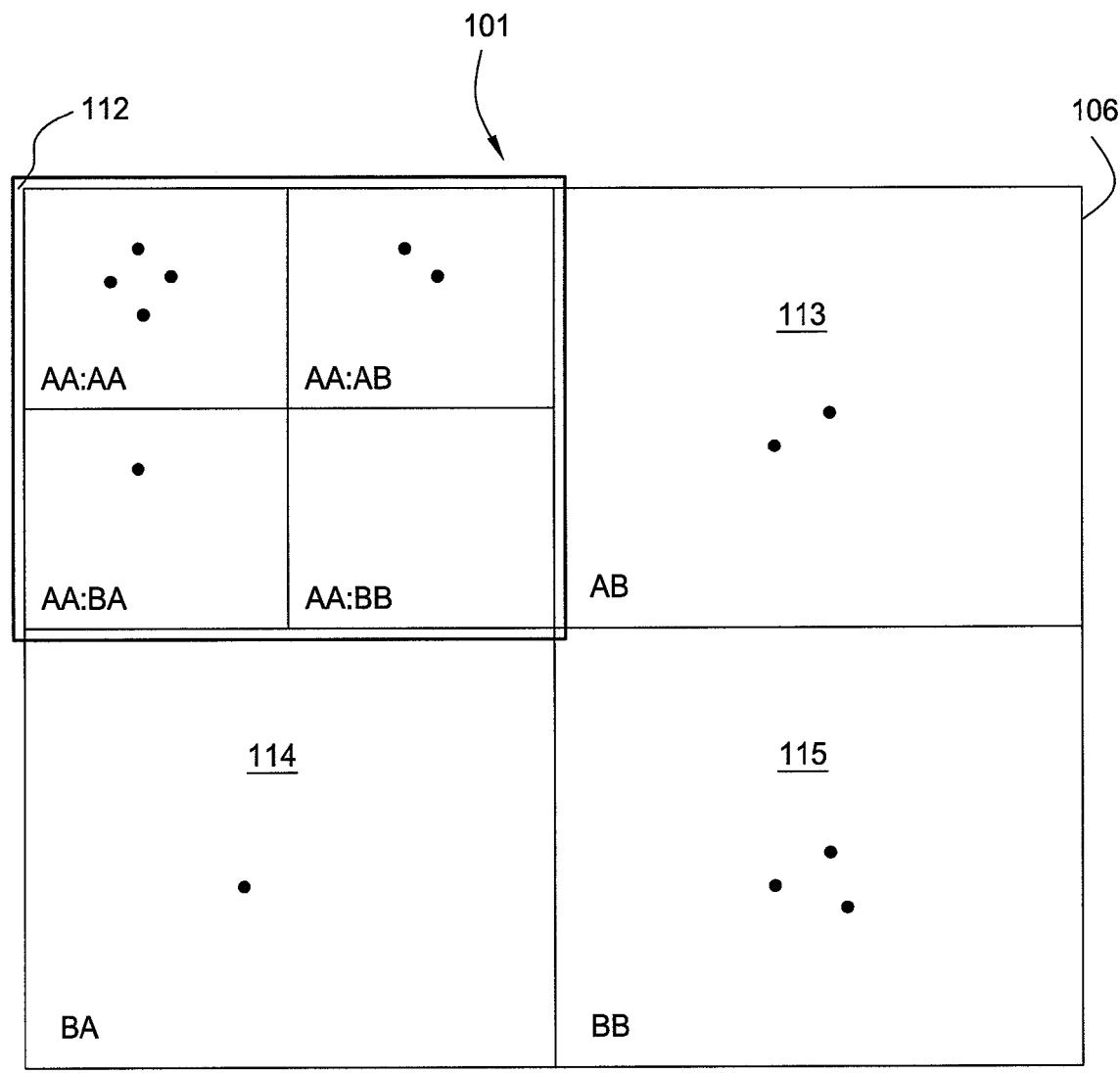
Figure 1B:

For a non-uniform data distribution, some cells may not exist. For example, the decomposition may terminate for some cells earlier than that of other cells. Consider the grid 106 in FIG. 1B for creating an index for non-uniform data 101. For example, the dots in each cell represent objects in the cell. For a binary decomposition, if a cell doesn't exist, none of its siblings exist either. The current method utilizes an inequality operator for queries. The inequality operator returns the entry corresponding to the largest value of a primary key not exceeding the queried value. For example, consider a query for cell BB:BA:BB in a 3 level decomposition. The unique primary key is 59. If the cell does not exist, then its siblings BB:BA:AA, BB:BA:AB and BB:BA:BA also should not exist as well. Therefore, a query for the cell with a highest value not exceeding 59 should return the cell BB:BA if it exists (the primary key is then 56). Otherwise, the method returns cell BB, which corresponds to primary key of 48.

In one embodiment, the current invention responds to a range query by using the directly indexed cell range. For example, if a range query is stated as primary key 56 to 59 in the above example, the indexed cell range that corresponds to the highest value not exceeding 59 is returned. Namely, the response may contain the cell BB:BA (i.e. 56).

Although the above embodiment of the current invention used a binary string to represent each cell (base 2), those skilled in the art would realize that the labels representing each cell may be of any base, e.g., base 16, base 10, base 3, etc. Those skilled in the art would also realize the decomposition may be performed based on unequal subdivision of cells. For example, the cell sizes during decomposition may be different. For the above example, the cell labeled "AA" may cover 50% of the region, 90% of the region, and so on.

In one embodiment, the current method is extended to multi-dimensional non-uniform data, e.g., three dimensional non-uniform data such as geographical data that incorporates elevation as the $3^{rd}$ dimension. In fact, time can be added as an additional dimension and so on.

Although the above embodiment is illustrated for geographical data, those skilled in the art would realize the current method may be used for other applications such as circuit board layouts, image processing, and so on.

Figure 2:
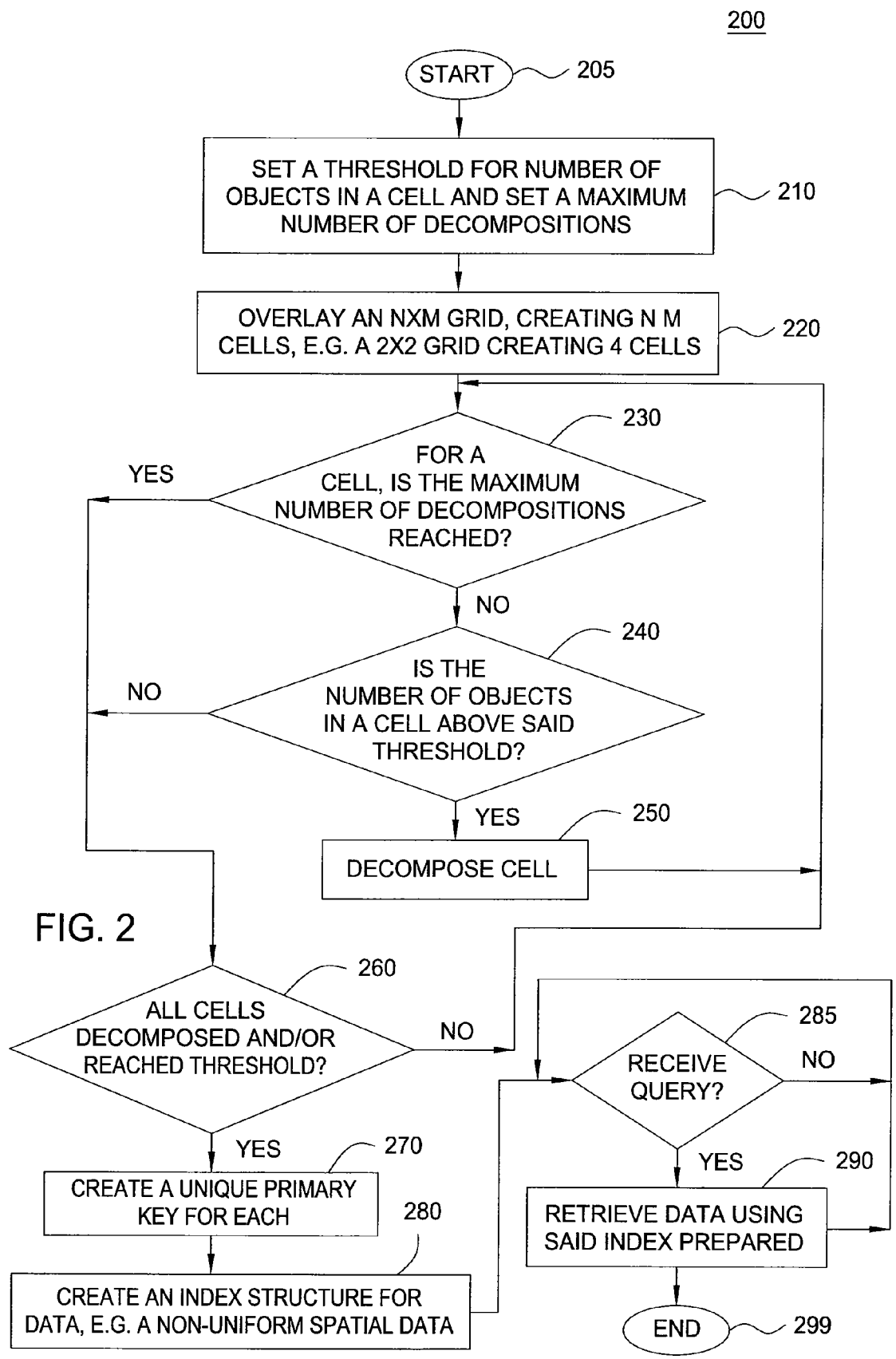
FIG. 2 illustrates a flowchart of a method for creating a non-uniform index structure for data.

FIG. 2 illustrates a flowchart of a method 200 for creating a non-uniform index structure for data. For example, method 200 can be implemented by a computing system. Method 200 starts in step 205 and proceeds to step 210.

In step 210, method 200 sets a threshold for a number of objects in a cell and sets a maximum number of decompositions. For example, a cell may be decomposed until either the number of objects within the cell is below a specific threshold, or a maximum number of decomposition is reached. Grid 106 in FIG. 1B may be used to illustrate the example of having a threshold for the number of objects in a cell set to 5. Note that setting the maximum number of decompositions is equivalent to setting a minimum cell size as described earlier.

In step 220, method 200 overlays an n×m grid, creating nm cells. For example, the method may first create a 2×2 grid creating 4 cells as illustrated in grid 106 of FIG. 1. The method then proceeds to step 230.

In step 230, method 200 determines whether or not the maximum number of decompositions is reached for a cell. For example, the method compares the number of decompositions performed for the cell with the maximum number permitted. If the maximum number of decompositions is performed for the cell, then the method proceeds to step 260 to determine whether or not there are other cells to examine. Otherwise, the method proceeds to step 240.

In step 240, method 200 determines whether or not the number of objects in a cell is above a predefined threshold. For the example in FIG. 1B, the method determines whether or not the cell has more than 5 objects. If the number of objects in the cell is above the threshold, the method proceeds to step 250. Otherwise, the method proceeds to step 260 to determine whether or not there are other cells to examine.

In step 250, method 200 decomposes the cell. For the example above, the method creates 4 cells (e.g., sub-cells) replacing the larger cell. For the example in FIG. 1B, cell 112 in grid 106 is decomposed because it contained 7 objects. The method then proceeds back to step 230.

In step 260, method 200 determines whether or not all cells are decomposed and/or reached a predefined threshold. For example, the method determines if all cells have either reached the maximum number of decompositions or have a number of objects below the threshold. If all cells are decomposed/reached the predefined threshold, then the method proceeds to step 270. Otherwise, the method proceeds back to step 230.

In step 270, method 200 creates a unique primary key for each cell. For example, the method creates a binary string representing each cell, performs zero-padding for cells below the maximum number of decompositions, and optionally converts the binary string to a base 10 numeric quantity to be used as a primary key.

In step 280, method 200 creates an index structure for the data using the primary keys. For example, the method may create an index structure for non-uniform spatial data to be retrieved using the primary keys created in step 270. It should be noted that any index structure can be created in this step. For example, the indexing of non-uniform spatial data in accordance with the present invention using a uni-dimensional index, such as the B+ tree structures can be used. However, the present invention is not limited to a particular type of index structure.

In step 285, method 200 determines whether or not it received a query. For example, a query for the data (e.g., objects) in a cell may be received. If a query is received, then the method proceeds to step 290. Otherwise, the method continues to receive queries.

In step 290, method 200 retrieves data using the index structure and provides a response to the query. The method then proceeds to step 285 to continue receiving other queries or ends in step 299.

It should be noted that although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 2 that recite a determining operation or involve a decision, do not necessarily require that both branches of the determining operation be practiced. In other words, one of the branches of the determining operation can be deemed as an optional step.

Those skilled in the art would realize that the non-uniform index structure of the current invention may be updated periodically to coincide with changes in a database. For example, if the database of objects (e.g., moving vehicles, vessels, or aircrafts within a geographical area) is updated hourly, then the index structure may be updated hourly. Note that for some types of data, e.g., spatial data in which the objects are buildings, the database may not change often. The present invention for creating a non-uniform index structure may be implemented in a computing device, e.g., a server, a personal computer, and the like. Users may send queries to the server to obtain information from the database. The server may receive the queries, interact with the users, and interact with the database using the non-uniform index structure.

Figure 3:
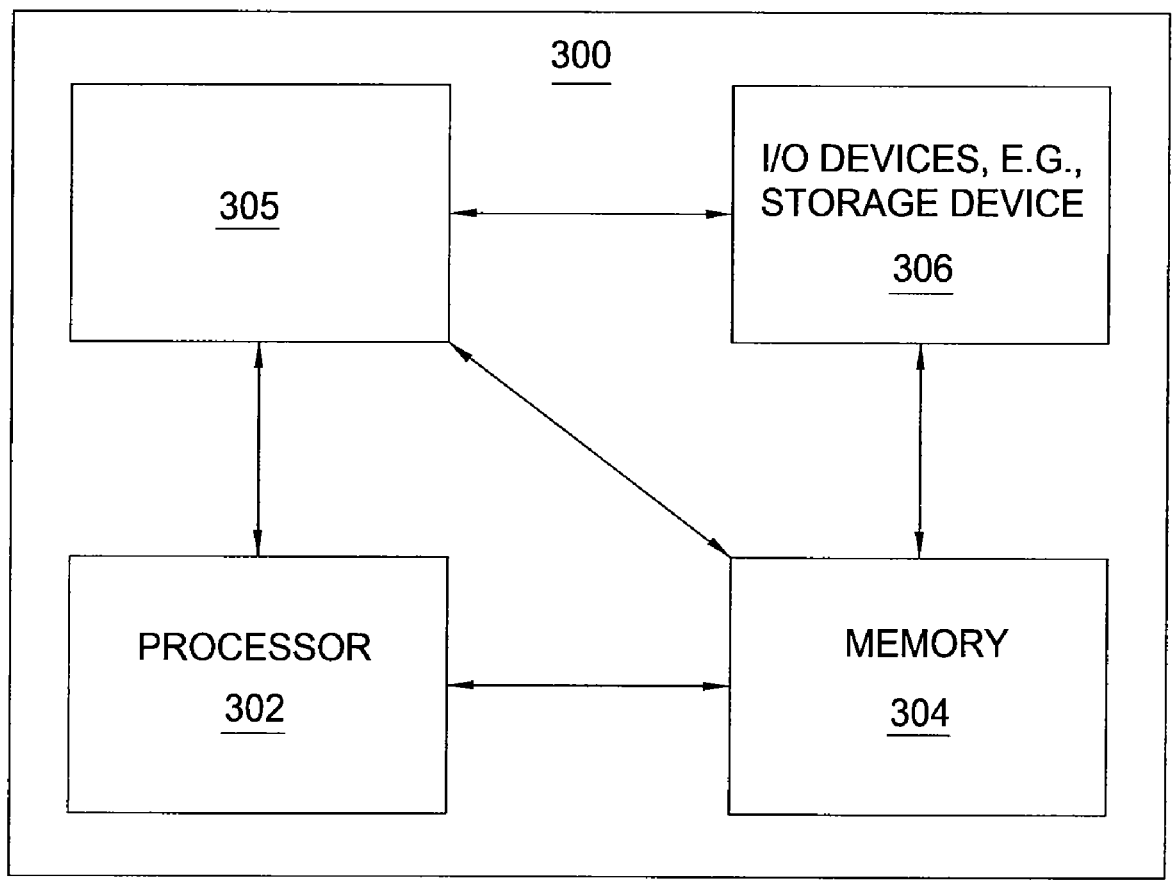
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for creating a non-uniform index structure for data, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for creating a non-uniform index structure for data can be loaded into memory 304 and executed by processor 302 to implement the functions as discussed above. As such, the present method 305 for creating a non-uniform index structure for data (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for creating a non-uniform index structure for data having a plurality of objects, comprising:

setting a threshold for a number of objects in a cell and a threshold for a maximum number of decompositions for a cell;

creating a plurality of cells by overlaying a grid over the plurality of objects;

decomposing each of the plurality of cells until either the threshold for the maximum number of decompositions is reached, or the number of objects in each cell is below the threshold for a number of objects in a cell, wherein the decomposing is performed by a processor, and wherein the decomposing each of the plurality of cells is performed based on unequal subdivision of cells;

creating a key for each cell, wherein the key for each cell is created by creating a n-ary string representing each cell;

performing zero-padding for each cell that has not reached the threshold for the maximum number of decompositions; and creating an index structure for the data using the key for each cell.

2. The method of claim 1, wherein the index structure is updated periodically.

3. The method of claim 1, wherein the index structure is for multi-dimensional non-uniform spatial data.

4. The method of claim 1, wherein the key for each cell is of base n, where n is a positive integer greater than zero.

5. The method of claim 1, further comprising:
converting the n-ary string to a base 10 numeric quantity.

6. The method of claim 1, further comprising:
using the index structure in response to a search query.

7. A computer-readable medium having stored thereon a plurality of instructions, the plurality of instructions including instructions which, when executed by a processor, cause the processor to perform a method for creating a non-uniform index structure for data having a plurality of objects, comprising:

setting a threshold for a number of objects in a cell and a threshold for a maximum number of decompositions for a cell;

creating a plurality of cells by overlaying a grid over the plurality of objects;

decomposing each of the plurality of cells until either the threshold for the maximum number of decompositions is reached, or the number of objects in each cell is below the threshold for a number of objects in a cell, wherein the decomposing each of said the plurality of cells is performed based on unequal subdivision of cells;

creating a key for each cell, wherein the key for each cell is created by creating a n-ary string representing each cell;

performing zero-padding for each cell that has not reached the threshold for the maximum number of decompositions; and creating an index structure for the data using the key for each cell.

8. The computer-readable medium of claim 7, wherein the index structure is updated periodically.

9. The computer-readable medium of claim 7, wherein the index structure is for multi-dimensional non-uniform spatial data.

10. The computer-readable medium of claim 7, wherein the key for each cell is of base n, where n is a positive integer greater than zero.

11. The computer-readable medium of claim 7, further comprising:
converting the n-ary string to a base 10 numeric quantity.

12. The computer-readable medium of claim 7, further comprising:
using the index structure in response to a search query.

13. An apparatus for creating a non-uniform index structure for data having a plurality of objects, comprising:

a processor configured to:
set a threshold for a number of objects in a cell and a threshold for a maximum number of decompositions for a cell;

create a plurality of cells by overlaying a grid over the plurality of objects;

decompose each of the plurality of cells until either the threshold for the maximum number of decompositions is reached, or the number of objects in each cell is below the threshold for a number of objects in a cell, wherein the processor further configured to decompose each of the plurality of cells based on unequal subdivision of cells;

create a key for each cell, wherein the key for each cell is created by creating a n-ary string representing each cell, wherein the key for each cell is further created by performing zero-padding for each cell that has not reached the threshold for the maximum number of decompositions; and create an index structure for the data using the key for each cell.

14. The apparatus of claim 13, wherein the index structure is for multi-dimensional non-uniform spatial data.

15. The apparatus of claim 13, wherein the key for each cell is further created by converting said n ary string to a base 10 numeric quantity.

* * * * *